United States Patent

Thompson et al.

[15] 3,699,568

[45] Oct. 17, 1972

[54] WEIGHTED LADDER TECHNIQUE

[72] Inventors: James E. Thompson, Scottsdale; Gerald J. D'Amato, Mesa, both of Ariz.

[73] Assignee: Motorola, Inc., Franklin, Ill.

[22] Filed: Dec. 21, 1970

[21] Appl. No.: 99,765

[52] U.S. Cl. ............................................ 340/347 DA
[51] Int. Cl. ............................................ H03k 13/04
[58] Field of Search ................................ 340/347 DA

[56] References Cited

UNITED STATES PATENTS

| | | | |
|---|---|---|---|
| 3,541,354 | 11/1970 | Basham | 340/347 DA |
| 3,305,857 | 2/1967 | Barber | 340/347 DA |
| 3,328,792 | 6/1967 | Stone et al. | 340/347 DA |
| 3,588,882 | 6/1971 | Propster | 340/347 DA |

*Primary Examiner*—Thomas A. Robinson
*Assistant Examiner*—Joseph M. Thesz, Jr.
*Attorney*—Mueller & Aichele

[57] ABSTRACT

There is disclosed a weighted ladder network for use in digital to analog converters which s characterized by faster speeds than the common R/2R and binary ladder configurations for the same total power consumption. The technique involves splitting up a conventional ladder network into two separate sections. The first section is a conventional binary ladder driven by equal current sources. The second section, however, involves weighting the resistance elements and the current sources in such a manner that the total resistance of the circuit is minimized.

5 Claims, 5 Drawing Figures

INVENTOR.

*James E. Thompson*

BY *Gerald J. D'Amato*

*Mueller & Aichele*

ATTY'S.

INVENTOR.

James E. Thompson
BY Gerald J. D'Amato

Mueller & Aichele
ATTY'S.

WEIGHTED LADDER TECHNIQUE

BACKGROUND

This invention relates to digital to analog conversion and more particularly to a hybrid ladder network which generates a series of voltages corresponding to a binary input.

Conventional digital to analog conversion circuits have made use of R/2R ladder networks. One of the outstanding features of this network is its relative insensitivity to small variations in the resistance of its elements. These circuits have, however, two drawbacks. The first is the amount of resistance that is necessary to obtain the requisite number of voltages corresponding to the number of bits of information that must be available at the output of the ladder network. Secondly, when more and more bits are added to the ladder, more resistive elements must be added to the network. This results in a tremendous amount of stray capacitance, which further results in an increase in settling time for the circuit and a corresponding decrease in speed. Thus R/2R ladders are generally incompatible with analog to digital conversion systems which require less than one microsecond conversion time. A typical 8 bit R/2R system, when utilizing a current drive, has a characteristic settling time in excess of 2 microseconds for a digital to analog conversion. This translates into about a 20 microsecond settling time for analog to digital conversion systems utilizing a R/2R digital to analog converter. Since the hybrid circuit to be described herein utilizes 78 times less resistance than the conventional R/2R ladder, for the same total power consumption a 100 nanosecond settling time is obtained in digital to analog conversion. This corresponds to about a 1 microsecond settling time for analog to digital converters utilizing the subject network.

While reduction of total resistance is important for speed, it is not the critical improvement which allows these ladders to be fabricated in integrated circuit form. What is critical is the resistance ratio. The resistance ratio refers to the ratio of the resistance of the largest resistive element to that of the smallest resistive element in the ladder network.

Networks having high ratios are difficult to fabricate accurately in integrated circuit form mostly because of mask tolerances, variation across the die of undercutting and diffusion depths. It will become apparent from the description of the subject network that one of its main advantages is a minimized resistance ratio.

Resistance ratios are important in a second type of ladder network commonly used in digital to analog conversion. This ladder, while not being weighted in a R/2R fashion, is weighted in a binary fashion. Typically, the resistors in the binary ladder are weighted 1, 1, 2, 4, 8, 16, etc., with the current drives to each of these elements being of equal value. In an 8 bit ladder the resistance ratio is (64/2) which is too high to be fabricated in a practical manner in integrated circuit form. The binary ladder does, however, have a settling time in the nanosecond range. While the speed of this circuit is attractive, it is extremely difficult to manufacture the necessary resistive elements in integrated form to necessary tolerances. Thus, while binary weighted ladders have been used in discrete form, there has been very little attempt to make them in integrated circuit configurations.

The hybrid ladder disclosed herein is capable of being manufactured as an integrated circuit and combines the relative insensitivity of the R/2R ladder to errors in element resistance with the speed of the binary weighted ladder. An optimal weighting system is disclosed in which the ladder is broken up into two sections. The first section is driven by equal current sources and is weighted in the conventional binary manner. The second section is composed of resistive elements having the same weight combined with current sources which are weighted so as to minimize the resistance ratio of the network while at the same time maintaining a settling time commensurate with the binary weighted ladder.

SUMMARY OF THE INVENTION

It is therefore an object of this invention to provide an improved hybrid ladder network for digital to analog conversion.

It is a further object of this invention to provide an improved hybrid ladder network and an improved method of weighting both the resistive elements in the network and the current drives thereto.

It is another object of this invention to provide a hybrid ladder for digital to analog conversion in which a portion of the ladder is a conventional binary ladder and in which a second section is composed of resistive elements of equal weight associated with current sources which are weighted so as to minimize the resistance of the network.

It is a further object of this invention to provide an improved ladder circuit having a relative insensitivity to resistance values and increased speed both of which result from a minimized resistance ratio.

It is a further object of this invention to split up a ladder network into two sections, the first of which operating as a conventional current driven binary ladder and the second of which having resistive elements which are assigned a single value, wherein the current sources driving these resistive elements are weighted in such a manner that binary voltages are available at the output of the hybrid ladder, the single value being that which minimizes the resistance ratio, thus maximizing speed and minimizing sensitivity to errors in the values of the resistive elements.

It is another object of this invention to provide an improved method of weighting the resistive elements and the current sources in a ladder network.

Other objects of this invention will be better understood upon reading the description of the following drawings.

BRIEF DESCRIPTION OF THE INVENTION

The subject invention most generally resides in a hybrid method of weighting the resistive elements and the current sources in a current driven ladder used to generate a series of voltages corresponding to binary numbers. The subject invention utilizes, as one portion of the ladder, a conventional binary weighted ladder network which employs equal current sources and binary weighted resistive elements. The second section of the ladder is composed of resistive elements having equal resistances associated with current sources whose weight is determined by a formula which minimizes the resistance ratio which is the maximum value of resistance in the ladder to the minimum value in the ladder. By reducing the resistance ratio, both less resistance and thus less stray capacitance is involved and the sensitivity of the network is minimized to a value equal to that of the R/2R ladder and significantly less than that of the binary ladder.

DETAILED DESCRIPTION OF THE INVENTION

The hybrid ladder disclosed herein has particular application to successive approximation type analog to digital conversion systems. These systems are well known in the prior art and depend on the generation of a series of binary weighted voltages. These voltages must be generated in a time short compared to the overall conversion time of the analog to digital conversion system. Therefore the speed of the analog to digital conversion is not significantly lengthened by the speed at which the ladder network can develop the required voltages.

Figure 1:
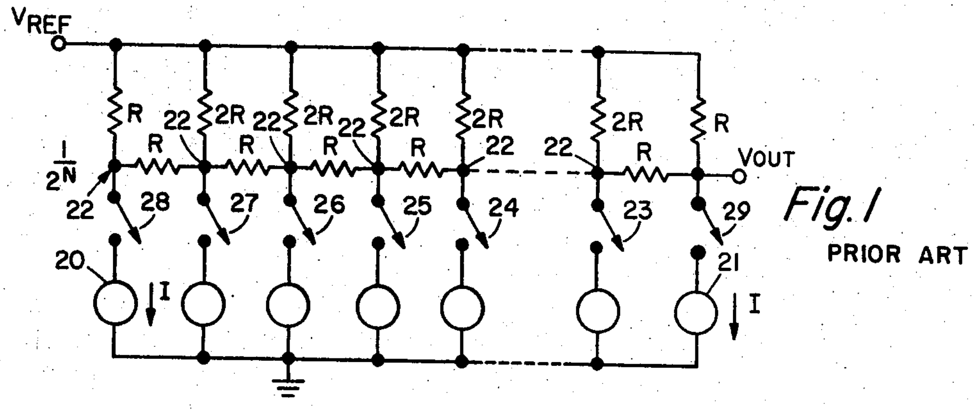
Fig. 1 PRIOR ART
FIG. 1 is a schematic diagram of a R/2R ladder network used extensively in the prior art.

Conventionally, a digital to analog ladder network is in the R/2R form shown in FIG. 1. It will be appreciated that there are several ways of using the ladder shown in FIG. 1, and although the current drive method will be discussed it will be appreciated that the circuit shown in FIG. 1 could be used as a voltage reference circuit in which the output of each section is coupled in parallel with the other sections to provide the appropriate voltage.

Figure 3:
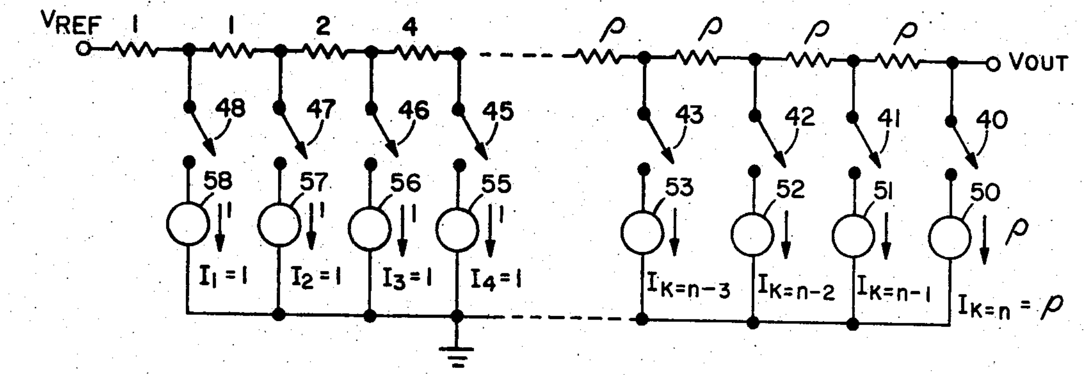
FIG. 3 is a schematic diagram of the hybrid ladder network and the improved weighting technique which forms the subject matter of the present invention.

As can be seen from the circuit shown in FIG. 1, a current source is applied at one end of the circuit as shown at 20 and the reference voltage is applied as shown. In a 5 bit ladder $V_{out}$ would have a weight of one thiry-seconds, whereas if a current source were applied at the other end of the circuit, as shown at 21, driven by a current I, the output would have a weight of one half. Thus, the circuit shown is capable of giving a binary weighting, 1/2, 1/4, 1/8, 1/16, 1/32, 1/64 . . .½n as switches 23–28 are closed. It will be appreciated that the R/2R configuration is merely a convenient scheme to use resistors having values which are not too diverse and yet obtain voltages having the appropriate binary weight. Because the values are not too diverse the voltages obtained are very little altered by slight errors in the resistance of each of the resistive components. The problem with the R/2R ladder is that it uses an excessive number of resistors. Associated with these resistors is an extensive amount of stray capacitance such that at a given current the speed of this circuit tends to be slow, particularly when the R/2R ladder is used as a voltage reference rather than being current driven as shown in FIG. 1. It will be appreciated that in the voltage reference mode an operational amplifier must be used at the output circuit which increases the settling time of the circuit to one microsecond or longer. The subject invention which is shown in FIG. 3 improves the speed of the digital to analog conversion to less than 20 nanoseconds by using 78 times less resistance.

Figure 2:
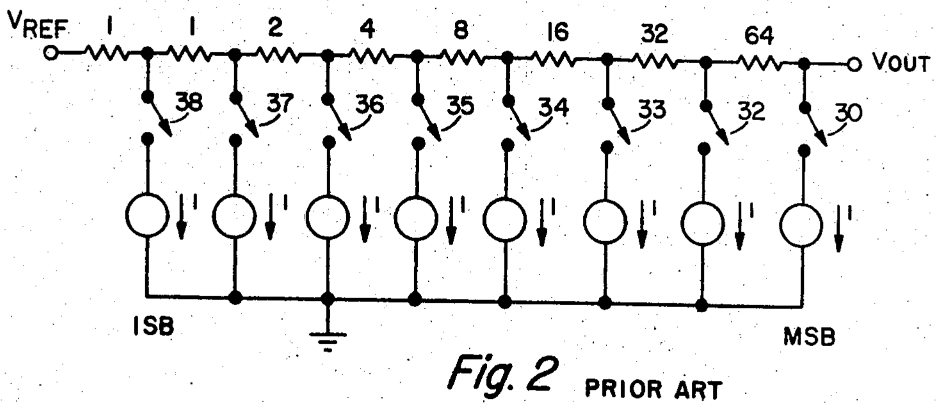
Fig. 2 PRIOR ART
FIG. 2 is a schematic diagram of a current driven binary weighted ladder network utilizing equal constant current sources.

Another way to accomplish digital to analog conversion is to form the circuit shown in FIG. 2. This circuit is not in actuality a ladder but a series of resistors that are weighted in binary fashion; 1, 1, 2, 4, 8, 16, 32, 64, etc.. Each of the resistive elements is driven by a current equal numerically to the resistance of the first element in the binary series. These current sources are shown generating a current of "1" for purposes of illustration. With switch 30 closed $V_{out}$ reflects the most significant bit with the least significant bit being represented by the closing of switches 30 through 38. The readout for this ladder occurs at the righthand side such that if the leftmost current source is turned on by switch 38 a voltage change will appear at the output equal to the current value "1" times the resistor value "1." However, when the second current source is turned on by switch 37 the output voltage will equal the current value of "1" times the resistance of both of the resistive elements connected such that $V_{out}$ = "1" times the quantity (1 +1) or 2. Thus the second current source has an effective weight of twice the first and likewise the third current source has an effective weight of four times the first and a fourth current source has an effective weight of 8 with the fifth current source having effective weight of 16, the sixth having an effective weight of 32, and the seventh having an effective weight of 64. The settling time of this type of circuit is quite low and in the nanosecond range for 5 bits. In a 5 bit system with five current sources, the largest resistor is eight times the smallest one. This yields a resistance ratio of 8, which is tolerable with respect to integrated circuit fabrication.

However, if the ladder is extended to include more than 5 bits, ratios of 16, 32, 64 and higher result. These ratios cannot be met accurately because of the inability to hold close tolerances on large resistor ratios in integrated circuits.

The subject invention recognizes that instead of utilizing strict binary weighting of the resistive components that a combined weighting system can be used. In addition, it has been found that there is a particular weighting system which minimizes the resistance ratio, which permits shorter settling times, and which permits fabrication in integrated circuit form. Thus the subject circuit combines the speed of the conventional binary ladder with the minimized sensitivity of the R/2R ladder.

The following weighting technique was derived empirically by altering the weights of the ladder to weights other than those dictated by strict binary rules. It has been empirically found that the weighting system shown by the circuit in FIG. 3 results in a minimum resistance ratio. As can be seen in FIG. 3, the circuit shown in FIG. 2 has been modified. In effect, one-half the elements of FIG. 2 representing the first four bits have been retained and the resistive elements corresponding to the remaining bits have been provided with equal resistances. The resistance of these latter resistive elements is assigned a value $\rho$ as shown. If it is assumed that in order to obtain a minimum resistance ratio the current source representing the most significant bit generates a current equal numerically to $\rho$, then the other current sources in this modified section are given values according to the following formula:

$$I_k=\frac{2^{(k-1)}}{\left(k-\frac{n}{2}\right)\rho+2\left(\frac{n}{2}-1\right)};\ k>\frac{n}{2} \quad (1)$$

where $I_k$: is the current generated by the $k$th current source and where $k$: is the current source number $n$: is the number of resistance elements $2^{(n/2-1)}$ is the resistance of the elements in the binary portion of the network and $2^{(k-1)}$ is the binary weighted output to be associated with the activation of the $k$th current source.

For k=n $$I_n=\frac{2^{(n-1)}}{\frac{n}{2}\rho+2\left(\frac{n}{2}-1\right)} \quad (2)$$

In order to obtain a value for $\rho$, $I_n$ is set equal to $\rho$.

Thus $$\rho=\frac{2^{(n-1)}}{\frac{n}{2}\rho+2\left(\frac{n}{2}-1\right)} \quad (3)$$

Or $$\frac{n}{2}\rho^2+2\left(\frac{n}{2}-1\right)\rho-2^{(n-1)}=0 \quad (4)$$

Thus $$\rho\left(\frac{n}{2}\rho+2\left(\frac{n}{2}-1\right)\right)=2^{(n-1)} \quad (5)$$

Figure 5:
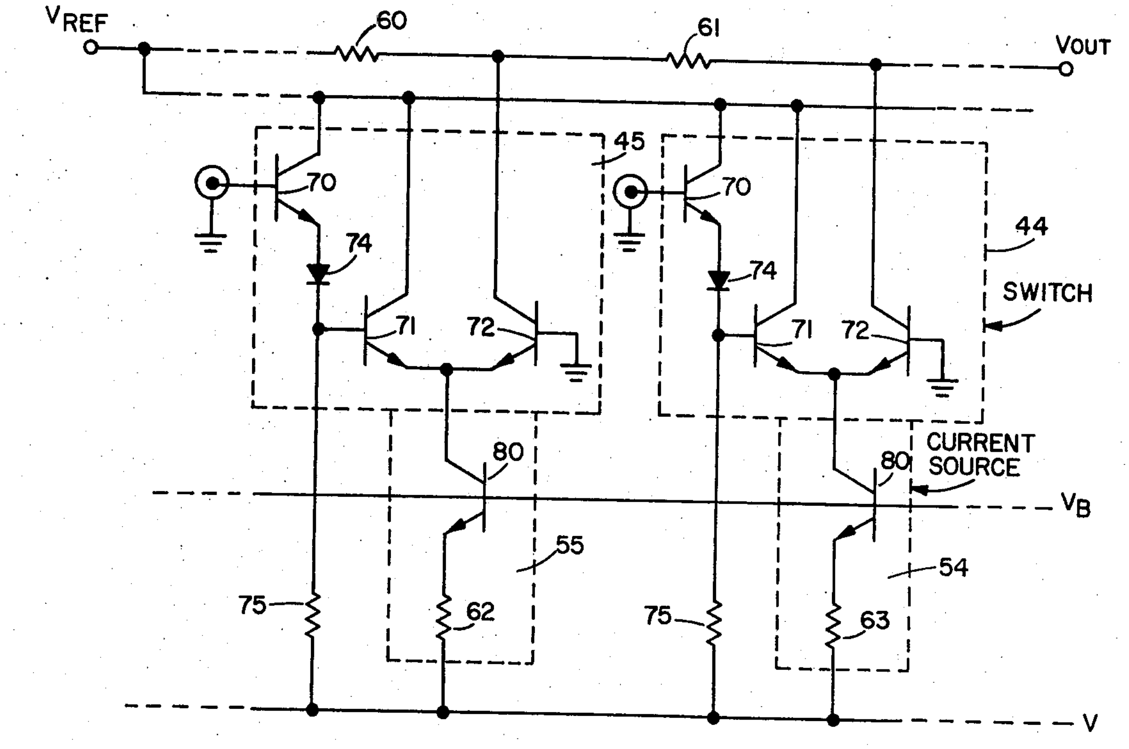
FIG. 5 is a schematic diagram of a portion of the subject ladder showing switching circuits and current sources.

In the 8 bit ladder shown in FIG. 5,
$n=8$, and $2^{(n-1)}=128$
Therefore $\rho(4\rho+8)=128$
and $\rho=4.74456264653...$
$\cong 4.745$ For the last current source in this 8 bit ladder $I_8=\rho=4.745$. For the $I_7$ current source $$I_7=\frac{64}{(7-4)\,4.745+8}=2.879$$

likewise $$I_6=\frac{32}{(6-4)\,4.745+8}=1.830$$

and $$I_5=\frac{16}{(5-4)\,4.475+8}=1.255$$

Figure 4:
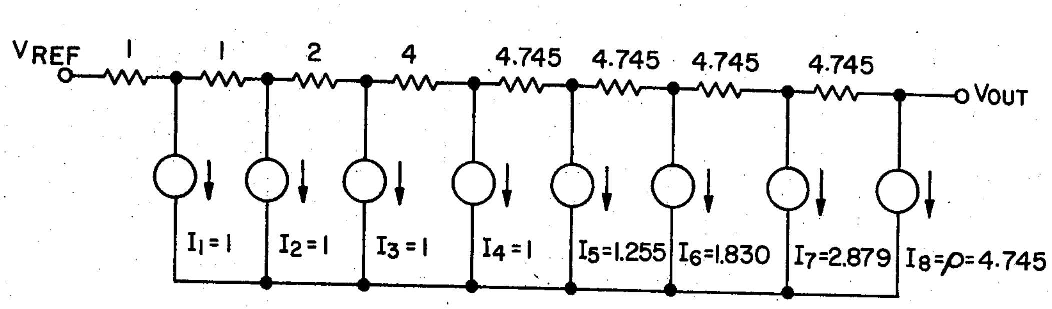
FIG. 4 is a schematic diagram showing the weighting of the resistive elements and the current sources for an 8 bit digital to analog ladder using the subject hybrid weighting technique.

This weighting is shown in FIG. 4. From empirical analysis it turns out that for an 8 bit ladder, weighting the first four bits in the binary fashion shown in FIG. 2 and weighting the remaining resistive elements $\rho$ so as to split the ladder in half results in a minimum resistance ratio, i.e., 4.745/1 = 4.745. In an 8 bit system a configuration 1, 1, 2, 4, 8, $\rho,\rho,\rho$ immediately results in a resistance ratio of 8/1 = 8. In an 8 bit system a configuration of 1, 1, 2, $\rho,\rho\ \rho\rho\rho$ also results in a higher resistance ratio since the fourth current source will have a value less than 1 so the ratio between the last current source and the fourth current source comes out larger than 4.745.

It will be appreciated that as the ladder contracts in number of bits so does the conventional portion of the circuit. As the ladder expands, the number of conventional circuit elements expands. $\rho$ for any of these ladders can be obtained by setting $k=n$ and $I_{k=n}=\rho$. From empirical analysis even bit ladders formed in this split configuration will always have optimal resistance ratios, high speeds and as low a sensitivity to poor resistance tolerances as the R/2R ladder.

It will be appreciated that the above analysis applies only to "even-bit" systems. In these systems the number of elements in the binary ladder was split in half such that the first half was weighted in a binary manner, while the second half had equal resistance weights with the last current source generating a current numerically equal to this resistance. This configuration always results in a minimum resistance ratio for "even-bit" systems.

If an odd number of bits is desired, then the ladder is split as close to the center as possible with the binary section being the smaller section. While no general expression is given for the odd-bit case, the hybrid odd-bit split configuration results in lower resistance ratios as compared with the R/2R ladder or binary weighted ladder. Although $\rho$ can be computed by solving the quadratic in equation 4, this number may not yield the minimum ratio. However, the odd-bit resistance ratio is low when compared with other ladder networks.

A portion of the actual circuit used for the hybrid ladder is shown in FIG. 5. Here switches 44 and 45 and current sources 54 and 55 of FIG. 3 are shown in the dotted boxes with like numbers. In one experimental configuration resistor 60 had a value of 80 ohms with the preceding resistors (not shown) having values of 40, 20 and 20 ohms respectively. Resistor 61 had a value of 95 ohms which is approximately 4.745 times the 20 ohm resistive element since in this 8 bit configuration weight "1" = 20 ohms. All the conventional current sources in this configuration are NPN transistors 80 with an emitter bias of −3 volts provided by an appropriate $V_B$. In FIG. 5 resistor 62 is chosen to be 2KΩ for $I$ = 1MA ($=V_{ee}=-5$V). Using current source 55 as a baseline, resistor 63 is made equal to 1,589 ohms to give current source 54 a current equal to 1.255 times the current generated by current source 55.

The switching circuits which couple each current source to its respective resistive element are identical. Each has an input NPN transistor 70 coupled between a reference potential, $V_{REF}$ and −V. The emitter of transistor 70 is coupled through a diode 74 to the base of one-half of a differential pair shown at 71 and 72. The emitters of the transistors in each differential pair are interconnected and coupled to their respective current source. When a voltage less than $2V_{be}$ drops is applied to the base of transistor 70 its output through diode 74 drives the base of transistor 71 negative with respect to the base of transistor 72, because of the current drawn through resistor 75. This turns transistor 72 ON and turns transistor 71 OFF. The current source thus pulls current through transistor 72, a corresponding resistor 60 (or 61) and all previous resistors. When a voltage greater than $2V_{be}$ is applied to the base of transistor 70, transistor 71 conducts and transistor 72 is turned OFF thus shunting the current generated by the current source to $V_{REF}$. Since the current sources are independent of the voltage across them the IR drop across the current source $I_k$ of FIG. 3 is independent of the IR drop across current source $I_{k-1}$ such that for n resistive elements or $n$ current sources there will be $2^{n-1}$ possible IR drops or voltages through the circuit.

In the above experimental configuration $V_{REF}$ = +5.OV and −V = −5V. Thus, a 0 to +5 volts output is attained at $V_{out}$ with a 20 millivolt bit size.

It will be appreciated that the subject weighting technique can be applied to any ladder-current source combination to minimize the resistance ratio and maximize on speed and stability.

What is claimed is:

1. A ladder network for providing a series of binary weighted currents comprising:

a first section having a first number of series connected resistive elements weighted in a binary fashion and a like number of current sources each generating a current equal numerically to the resistance of the first resistive element in said series, said current sources adapted to be connected between a reference potential and one end of a corresponding resistive element; and a second section, connected in series with said first section and having a second number of series connected resistive elements, each having a resistance equal to a predetermined number, and a like number of current sources, the current sources in said second section adapted to be connected between said reference potential and one end of a corresponding resistive element in said second series, the current source adapted to be connected to the last of the elements in said second number generating a current equal to said predetermined number, and the remaining current sources in said second section generating those currents which will provide binary weighted voltages between the free end of said last resistive element and said reference potential, when they are connected to their respective resistive elements, whereby the resistance ratio of said network can be minimized such that said network has a low settling time and can be fabricated in integrated circuit form.

2. The ladder network as recited in claim 1 wherein said ladder contains an odd number of resistive elements and wherein said first section contains one less resistive element than said second section.

3. The ladder network as recited in claim 1 wherein each section contains an equal number of resistive elements.

4. The ladder network as recited in claim 3 wherein said predetermined number is given by solving the following formula for $\rho$ $$\frac{n}{2}\rho^2+2^{\left(\frac{n}{2}-1\right)}\rho-2^{(n-1)}=0$$

where $n$ is the total number of resistive elements in said network.

5. The ladder network as recited in claim 4 wherein the current generated by a given current source is given by the following formula $$I_k=\frac{2^{(k-1)}}{\left(k-\frac{n}{2}\right)\rho+2\left(\frac{n}{2}-1\right)};\ k>\frac{n}{2}$$

where $I_k$ is the current in the $k$th current source, whereby the resistance ratio of said ladder network is at a minimum.

* * * * *